Dec. 5, 1961  J. H. WISE  3,011,665
MATERIAL HANDLING APPARATUS
Filed Dec. 4, 1958  2 Sheets-Sheet 1

INVENTOR.
JOSEPH H. WISE.
BY
*Piercy Truman*
ATTORNEY.

Dec. 5, 1961  J. H. WISE  3,011,665
MATERIAL HANDLING APPARATUS
Filed Dec. 4, 1958  2 Sheets-Sheet 2
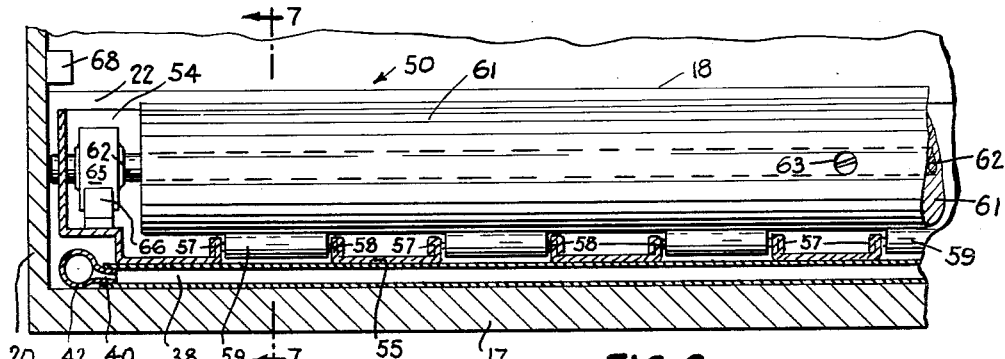
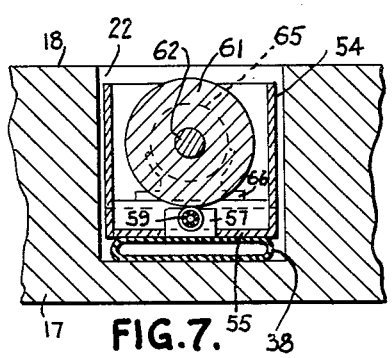
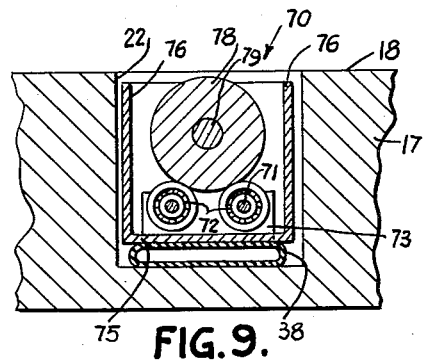
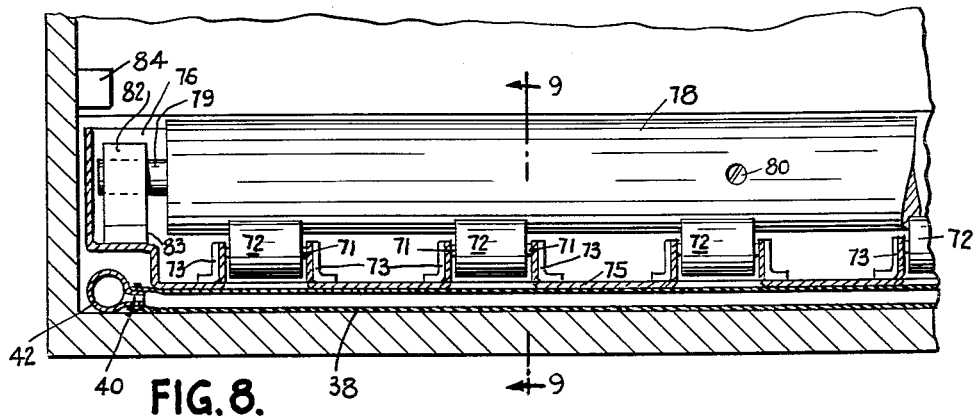
INVENTOR.
JOSEPH H. WISE
BY
Percy Freeman
ATTORNEY.

United States Patent Office 3,011,665
Patented Dec. 5, 1961

3,011,665
MATERIAL HANDLING APPARATUS
Joseph H. Wise, 234 Bedford Ave., Mount Vernon, N.Y.
Filed Dec. 4, 1958, Ser. No. 778,241
7 Claims. (Cl. 214—84)

This invention relates to material handling apparatus and, more particularly, to apparatus for facilitating the movement and securement of freight and other heavy articles upon a load-supporting platform.

While there are many types of frictionless load-supporting platforms, such as conveyors, having large number of ball or roller elements projecting upwardly above the supporting member, such are not suitable for many loading and storage platforms since freight and other heavy articles supported thereon can too readily shift from one position to another. On the other hand, loading and storage platforms devoid of such frictionless support means require the use of dollies, trucks, suspension rails, or the like, in order to facilitate the movement of heavy articles from one location to another. Accordingly, it is an object of the present invention to provide material handling apparatus in the form of a load-supporting platform having an upwardly facing frictional load-supporting surface and auxiliary support means that is selectively movable between a first normal position beneath the level of the frictional load-supporting surface and a second raised position elevated upon the level of the frictional load-supporting surface, so as to selectively and conveniently convert the platform to either a friction or a frictionless support means for securing or transporting heavy articles, respectively, relative thereto.

A further object of the present invention is to provide material handling apparatus that includes a main load supporting platform of the above type that is particularly suited for use on trucks, flat cars, and other transportation units.

A further object of the present invention is to provide fluid pressure-responsive actuating means for selectively effecting movement of the auxiliary anti-friction support means between the normal inoperative position and the actuated elevated position relative to the load-supporting surface of the platform to facilitate the movement of heavy articles across such platform.

Still a further object of the present invention is to provide material handling apparatus of the type described that further embodies additional retractable anti-friction rollers for loading articles onto the platform in a direction transversely of the direction of movement of the heavy articles longitudinally of the platform, so as to facilitate the side loading of trucks and other vehicles in a simple and efficient manner.

All of the foregoing and still further objects and advantages of this invention will become apparent from a study of the following specification, taken in connection with the accompanying drawing, wherein:

FIG. 6 is a view similar to FIG. 4, illustrating a modified form of auxiliary anti-friction roller assembly.

FIG. 7 is a transverse cross-sectional view taken along line 7—7 of FIG. 6.

FIG. 8 is a view similar to FIG. 4, illustrating still another embodiment of the anti-friction roller assembly forming a part of the present invention.

FIG. 9 is a transverse cross-sectional view taken along line 9—9 of FIG. 8.

Figure 1:
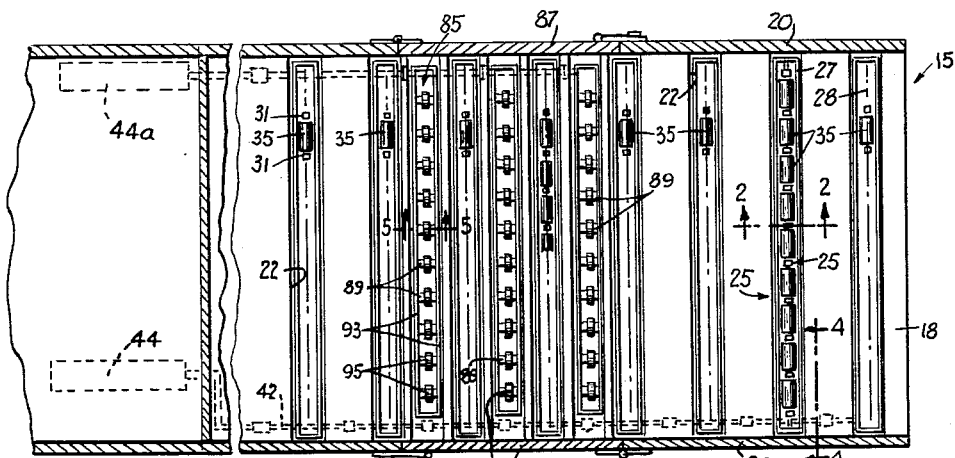
FIG. 1 is a fragmentary top plan view of a truck body embodying material handling apparatus made in accordance with the present invention.

Referring now more in detail to the drawing, and more particularly to FIGS. 1 to 4 thereof, material handling apparatus made in accordance with the present invention is shown to be provided in the form of a platform 15 that is, by way of example, associated with a truck body and functions as a floor therefor. As is particularly shown in FIG. 4 of the drawing, a main floor member 17 of the truck body defines a main load supporting surface 18 that may be serrated or otherwise roughened to provide a stable supporting surface for any articles placed thereon. This main floor 17 also defines a plurality of longitudinally spaced apart parallel and transversely extending wells 22, within certain ones of which are roller bearing assemblies 25 that provide an anti-friction auxiliary load support means.

Each roller bearing assembly 25 made in accordance with the form of the invention illustrated in FIGS. 1 to 4 of the drawing, includes an upwardly opening channel-shaped member having sides 27 and a connecting base web 28. Yoke-shaped mounts 30 secured in spaced apart relationship along the base 28 of the channel member support roller bearing assemblies 31 which, in turn, rotatably support an elongated main shaft 33 to which enlarged rollers 35 are secured, such as by set screws 36, intermediate adjacent ball bearing assemblies 31.

Figure 3:
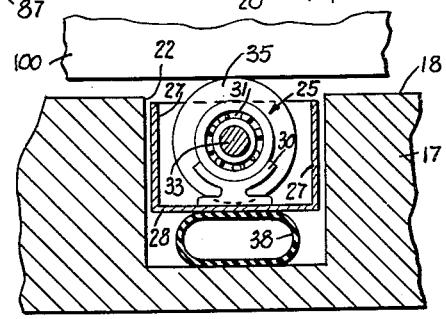
FIG. 3 is a view similar to FIG. 2, showing the anti-friction roller assembly in an adjusted elevated position for facilitating the movement of heavy articles across the load-supporting platform.

A deformable sleeve 38 is secured between the bottom of each well 22 and each associated channel-shaped member. In response to the supply of fluid under pressure from a fluid pressure source 44 through a delivery line 42 and individual inlet duct 40, each such deformable sleeve 38 is inflatable, as shown in FIG. 3, to elevate the entire roller bearing assembly 25 to the elevated position.

Figure 2:
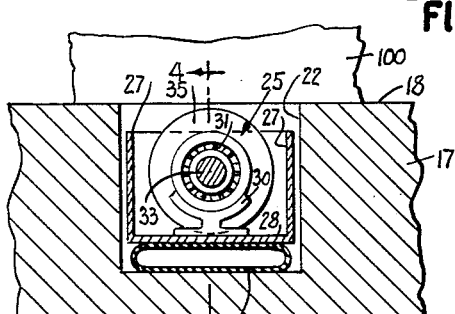
FIG. 2 is an enlarged transverse cross-sectional view taken along line 2—2 of FIG. 1, illustrating a roller assembly and pressure responsive actuating means made in accordance with one form of the present invention.
Figure 4:
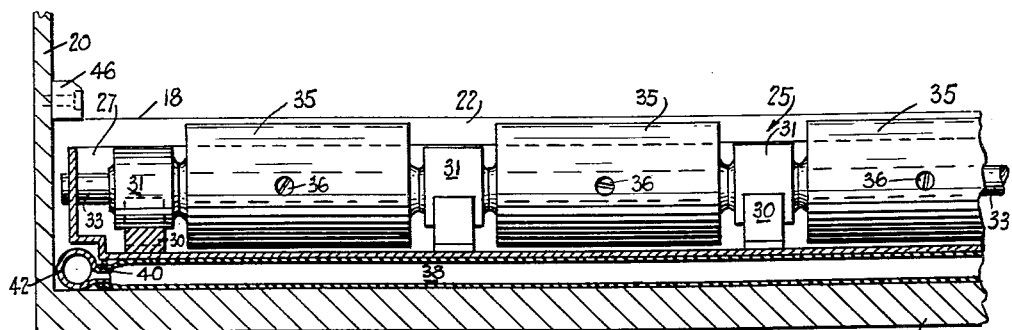
FIG. 4 is an enlarged fragmentary cross-sectional view taken along line 4—4 of FIG. 1 further illustrating a roller assembly constructed in accordance with the embodiment of the present invention illustrated in FIGS. 1 to 3.

The source 44 of fluid pressure may be a pneumatic pressure source, a hydraulic pressure source, or the like, so that any fluid under pressure may be conveniently used to control the actuation of the roller bearing assemblies 25. With reference to FIGS. 2 and 3 of the drawing, it will be evident that each such roller bearing assembly 25 is selectively movable between a normal depressed position with the main rollers 35 completely disposed beneath the level of the load supporting surface 18, and an elevated second position illustrated in FIG. 3, wherein the rollers 35 project upwardly above the load supporting surface 18 of the main platform 17 so as to effectively raise the freight or load 100 above the friction surface 18 of the floor to facilitate the movement thereof from one position to another. The roller bearing assemblies 25 and associated wells 22 are placed sufficiently close enough to each other to enable all types of loads to be conveniently moved from one position to another along the entire length thereof whenever required, following which, the roller bearing assemblies are allowed to return to the normal depressed position illustrated in FIG. 2, so that such load 100 may be transported or secured in a stable manner upon the frictional load supporting surface 18. The upward movement of the roller bearing assemblies 25 is limited by stops 46 secured to the side wall 20 of the enclosure, as shown in FIG. 4, whereby all of the roller bearing assemblies are automatically limited to upward movement to a single predetermined level.

Reference is now made to FIGS. 6 and 7 of the drawing that illustrate another embodiment of anti-friction auxiliary load support or roller bearing assembly 50 in which the channel-shaped member disposed within each well 22 similarly includes a pair of spaced apart sides 54 and a connecting base 55. However, the base flange 55 is stamped and formed to provide a plurality of upwardly projecting flanges 57 along the entire length thereof that serve as brackets for rotatably supporting central shafts 58 of individual needle roller bearings 59. In this embodiment, a single main roller 61 secured to a main shaft 62 extends substantially the entire length of the channel-shaped member. This roller 61 is supported upon the needle roller bearings 59, as shown in FIG. 7, to provide an efficient anti-friction bearing surface for transporting heavy articles across the platform when the deformable sleeve 38 is inflated. The main roller 61 is secured to the shaft 62, such as by a set screw 63, while the opposite ends of the shaft 62 are rotatably supported upon ball bearing units 65 carried upon brackets 66 integral with the upwardly opening channel member. Stops 68 at opposite ends of each channel member limit the upward movement of the entire roller bearing assembly 50, for purposes hereinbefore described.

Reference is now made to FIGS. 8 and 9 of the drawing which illustrate still another embodiment of the present invention wherein the anti-friction auxiliary load support includes roller bearing assemblies 70 which are shown to include longitudinally spaced apart pairs of needle bearing assemblies 72 having longitudinal shafts 71 carried upon angle brackets 73 secured to the base 75 of the upwardly opening channel member, intermediate the sides 76 thereof. The single main roller 78 of each such roller bearing assembly 70 is secured upon a main shaft 79, such as by a set screw 80 in supported engagement with all of the pairs of needle bearing assemblies 72. The opposite ends of the main shaft 79 are rollably carried by individual ball bearing assemblies 82 integral with brackets 83 supported upon the channel-shaped member. Stop elements 84 associated with the opposite ends of each anti-friction auxiliary support 70 limit the upward movement thereof, for the purposes hereinbefore described.

Figure 5:
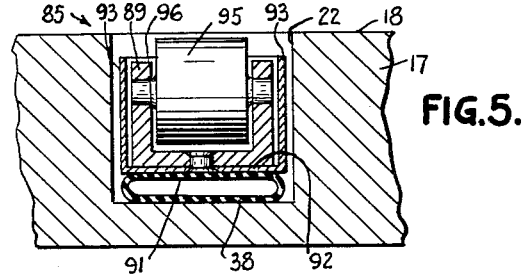
FIG. 5 is an enlarged fragmentary cross-sectional view taken along line 5—5 of FIG. 1 of additional roller elements facilitating the transverse loading of the platform from one side thereof.

Reference is now made to FIGS. 1 and 5 of the drawing that illustrate a further feature of the present invention which facilitates the side loading of the platform, that is, in a direction substantially normal to the regular direction of movement of the articles longitudinally along the main dimension of the platform. Selected ones of the wells 22, such as those adjacent to the side doors 87 of the truck body, are provided with other roller assemblies 85. Each such roller assembly 85 includes an upwardly opening channel having a base 92 and spaced apart parallel sides 93. Individual cup-like elements 89 are secured to the base 92 of each such upwardly opening channel, such as by a rivet 91. In addition, a single roller 95 carried upon a shaft 96 is rollably supported within each such cup 89 for rotation about the axis of the shaft 96 that is placed in a position so as to extend perpendicular to the longitudinal plane of the platform, in which the articles are normally moved. However, these anti-friction load support assemblies 85 enable such material handling platform to receive articles in a transverse direction, following which they may be moved in a longitudinal direction upon the other rollers to the desired location. The deformable sleeve 38 associated with each such assembly 85 is controlled simultaneously with all of the other such deformable sleeves associated with the anti-friction auxiliary load support assemblies throughout the entire material handling platform 15.

It will now be appreciated that this apparatus simplifies the process of loading freight and cargo on trucks, railroad freight and flat cars, ship cargo floors, and warehouse areas. This apparatus can also be used for alleys, or other areas where freight and cargo consisting of crates, cartons, etc. must be moved or left standing. When the articles are being loaded, the actuation of the deformable sleeves 38 and fluid pressure apparatus elevates the auxiliary load support rollers to enable such heavy articles to be easily moved from one location to another. After the articles are in the proper location, the fluid pressure apparatus is deenergized so that the roller assemblies return to their normal depressed position, thus leaving the articles in frictional engagement upon the load supporting surface 18 of the platform so that they are stably supported during any movement of the supporting platform 15.

While this invention has been described with particular reference to the construction shown in the drawing, it is to be understood that such is not to be construed as imparting limitations upon the invention, which is best defined by the claims appended hereto.

Having thus described my invention, what I claim as new and desire to secure by Letters Patent, is:

1. In a load-carrying vehicle, material handling apparatus comprising in combination, a main load-supporting vehicle floor having a substantially plane upwardly facing frictional load-supporting surface, and having a plurality of transverse spaced-apart wells extending downwardly from said surface, anti-friction auxiliary support means vertically movable in said wells and comprising a plurality of individual roller assemblies, each of which comprises an upwardly opening channel member with at least one roller rotatably carried by each said channel member, and one such assembly being separately permanently supported in each of said wells for only vertical movement between a first position beneath the level of said main load-supporting surface and a second raised position extending above and parallel to the level of said main load-supporting surface, and elevating means selectively effecting movement of said auxiliary support means between said first and second positions.

2. Material handling apparatus as set forth in claim 1, further comprising a plurality of roller bearings rotatably supporting each said roller upon each said channel member.

3. Material handling apparatus as set forth in claim 2, wherein said elevating means comprises a deformable fluid pressure-responsive tube within each said well supporting each one of said roller assemblies thereupon, and a source of fluid pressure communicating with the interior of each said tube, whereby fluid under pressure is operative to inflate each said tube to elevate each said associated roller assembly at least partially above said load-supporting surface.

4. Material handling apparatus as set forth in claim 3, wherein all of said wells and roller assemblies are disposed in longitudinally spaced apart parallel relationship relative to said supporting surface, and each said roller is supported for rotation about an axis extending parallel to the transverse plane of said platform for carrying a load in a longitudinal direction across said wells and roller assemblies, each said roller assembly comprising a main shaft, and a plurality of spaced apart rollers rotatably supported upon said main shaft, and said roller bearings being interposed between adjacent ones of said spaced apart rollers vertically supporting said main shaft.

5. Material handling apparatus as set forth in claim 4, wherein predetermined other roller assemblies each include a plurality of spaced apart additional rollers extending transversely above said supporting surface in at least one of said wells, said additional rollers being supported for rotation about axes extending parallel to the longitudinal plane of said platform for transporting a load in a transverse direction relative to the longitudinal plane of said platform.

6. Material handling apparatus as set forth in claim 4, wherein each said roller assembly comprises a main shaft, a single elongated main roller carried by said main shaft, and a plurality of longitudinally spaced apart individual needle roller bearings carried by said channel member rollably and supportingly engaging the lower surface portion of said elongated roller.

7. Material handling apparatus as set forth in claim 4, wherein each said roller assembly comprises a main shaft, a single elongated main roller carried by said main shaft, and a plurality of longitudinally spaced apart pairs of individual needle roller bearings carried by said channel member defining cradles rollably and supportingly engaging the lower surface portion of said elongated main roller.

References Cited in the file of this patent

UNITED STATES PATENTS

| | | |
|---|---|---|
| 1,663,003 | Curtis | Mar. 20, 1928 |
| 2,360,661 | Eddy et al. | Oct. 17, 1944 |
| 2,828,027 | Stevenson et al. | Mar. 25, 1958 |
| 2,854,158 | Copeland | Sept. 30, 1958 |